US008032241B2

(12) United States Patent
Lee et al.

(10) Patent No.: US 8,032,241 B2
(45) Date of Patent: Oct. 4, 2011

(54) APPARATUS FOR PLAYING BACK AUDIO FILES AND METHOD OF NAVIGATING THROUGH AUDIO FILES USING THE APPARATUS

(75) Inventors: Kwang-hyeon Lee, Yongin-si (KR); Dong-geon Kong, Yongin-si (KR); Ji-hye Chung, Seoul (KR); Chang-kyu Choi, Seongnam-si (KR); Yeun-bae Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1075 days.

(21) Appl. No.: 11/600,799

(22) Filed: Nov. 17, 2006

(65) Prior Publication Data

US 2007/0190931 A1 Aug. 16, 2007

(30) Foreign Application Priority Data

Feb. 10, 2006 (KR) ........................ 10-2006-0013270

(51) Int. Cl.
*G06F 17/00* (2006.01)

(52) U.S. Cl. ......................................................... 700/94

(58) Field of Classification Search .................... 700/94; 369/30.04, 30.08, 30.3, 1–12; 381/94.5, 381/102–109
See application file for complete search history.

(56) References Cited

U.S. PATENT DOCUMENTS

2004/0264714 A1* 12/2004 Lu et al. ........................ 381/104
2005/0004690 A1 1/2005 Zhang et al.
2005/0021470 A1 1/2005 Martin et al.
2005/0049941 A1 3/2005 Kaplan
2005/0219963 A1 10/2005 Fujisawa

FOREIGN PATENT DOCUMENTS

EP 0 626 690 A1 5/1994
JP 3-203069 A 9/1991
JP 8-44350 A 2/1996
JP 2000-138922 A 5/2000
KR 10-0293158 B1 3/2001
KR 10-0353159 B1 9/2002
KR 10-2004-0050574 A 6/2004
WO 2004/073309 A1 8/2004

OTHER PUBLICATIONS

Pro Tools 7.0 Reference Manual, copyright 2005.*
Wikipedia.com entry for Audio Normalization; Retrieved Nov. 15, 2010.*

* cited by examiner

*Primary Examiner* — Andrew C Flanders
(74) *Attorney, Agent, or Firm* — Sughrue Mion, PLLC

(57) ABSTRACT

A method of navigating through audio files and an apparatus for playing back audio files using the method are provided. The apparatus for playing back audio files includes an input module which receives from a user a command to switch the apparatus to a navigation mode, a storage module which stores a plurality of audio files, each audio file comprising a highlight section, a control module which extracts the audio files from the storage module in response to the command received by the input module and plays back the highlight sections of the audio files while adjusting a volume level for each of the audio files, and an output module which outputs to the user the highlight sections of the audio files played back by the control module.

18 Claims, 11 Drawing Sheets

FIG. 9A

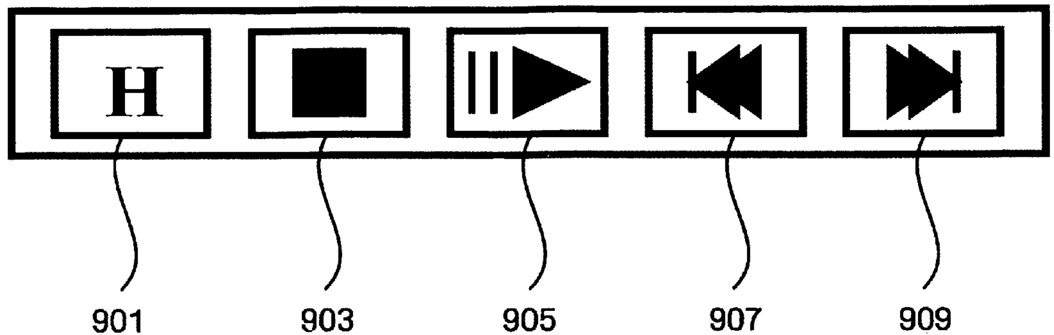

FIG. 9B

| BUTTON | USER ACTION | OPERATION OF APPARATUS FOR PLAYING BACK AUDIO FILES |
|---|---|---|
| ■ | CLICKED | STOP PLAYBACK OF HIGHLIGHT SECTION OF CURRENT SONG OR MUSIC |
| ll▶ | CLICKED | PLAY BACK HIGHLIGHT SECTION OF CURRENT SONG OR MUSIC |
| ⏮ | CLICKED | PLAY BACK HIGHLIGHT SECTION OF PREVIOUS SONG OR MUSIC OR MUSIC |
| | PRESSED FOR PREDETERMINED TIME | QUICKLY NAVIGATE THROUGH HIGHLIGHT SECTIONS OF PREVIOUS SONGS OR MUSIC BY PLAYING BACK ONLY PART OF EACH OF HIGHLIGHT SECTIONS |
| ⏭ | CLICKED | PLAY BACK HIGHLIGHT SECTION OF NEXT SONG OR MUSIC OR MUSIC |
| | PRESSED FOR PREDETERMINED TIME | QUICKLY NAVIGATE THROUGH HIGHLIGHT SECTIONS OF NEXT SONGS OR MUSIC BY PLAYING BACK ONLY PART OF EACH OF HIGHLIGHT SECTIONS |

FIG. 9C

| BUTTON | USER ACTION | OPERATION OF APPARATUS FOR PLAYING BACK AUDIO FILES |
|---|---|---|
| | CLICKED | STOP PLAYBACK OF CURRENT SONG OR MUSIC |
| 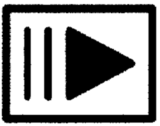 | CLICKED | TEMPORARILY STOP PLAYBACK OF CURRENT SONG OR MUSIC |
| | CLICKED | PLAY BACK PREVIOUS SONG OR MUSIC |
| | PRESSED FOR PREDETERMINED TIME | QUICKLY NAVIGATE BACKWARD |
| | CLICKED | PLAY BACK NEXT SONG OR MUSIC |
| | PRESSED FOR PREDETERMINED TIME | QUICKLY NAVIGATE FORWARD |

APPARATUS FOR PLAYING BACK AUDIO FILES AND METHOD OF NAVIGATING THROUGH AUDIO FILES USING THE APPARATUS

CROSS-REFERENCE TO RELATED APPLICATION

This application claims priority from Korean Patent Application No. 10-2006-0013270 filed on Feb. 10, 2006, in the Korean Intellectual Property Office, the disclosure of which is incorporated herein by reference in its entirety.

BACKGROUND OF THE INVENTION

1. Field of the Invention

Apparatuses and methods consistent with the present invention relate to navigation and playback of audio files, and more particularly, to an apparatus for playing back audio files which can play back an audio file comprising a highlight section, and a method of navigating through audio files using the apparatus.

2. Description of the Related Art

Sometimes, there is a need to play back only part of an audio file that comprises various acoustic information such as music information, sound information, or voice information, according to a user's preferences or the purpose of use of the audio file. An example of an audio file played back in this manner is a ring tone of a mobile phone.

A portion of an audio file that is chosen to be played back is referred to as a highlight section, and this will hereinafter be described in detail with reference to FIG. 1.

Referring to FIG. 1, an audio file is played back between a time t0 and a time t3, and a line 100 represents variations in the amplitude of music being played back. When a portion of the audio file corresponding to a time period between a time t1 and a time t2 is chosen as a highlight section, only the portion chosen as the highlight section can be played back. Then, a user can easily identify the type of a music item in the audio file by listening to only the portion chosen as the highlight section.

In general, a portion of an audio file having a high amplitude such as music, sounds, or voices is chosen as a highlight section, thereby enabling a user to easily recognize music, sounds or voices included in the audio file.

However, when a portion of an audio file having a high amplitude is chosen as a highlight section, loudness and discontinuity in the playback of the audio file may cause aural discomfort or irritate a user.

In addition, when navigating through a plurality of music files on a highlight section-by-highlight section basis (this type of audio file navigation method will hereinafter be referred to as a highlight-navigation method), repeated discontinuities in the playback of the music files may also increase the aural discomfort of a user.

In this regard, this highlight-navigation method may not be well suited for providing a user interface for audio file navigation.

Typical portable audio file players need to be equipped with an additional function button in order to provide a highlight navigation function. However, since size increases in portable audio file players are clearly limited, the structure of portable audio file players becomes complicated and gives poor usability when they are equipped with such an additional function button. In addition, existing highlight navigation techniques do not provide a user action-based reasoning function.

SUMMARY OF THE INVENTION

The present invention provides a method of navigating through audio files. The method allows a user to effectively navigate through a plurality of audio files each comprising a highlight section with the aid of an external input unit and through sound transitions by using auditory components.

The present invention also provides an apparatus for playing back audio files using the method.

According to an aspect of the present invention, there is provided an apparatus for playing back audio files including an input module which receives from a user a command to switch the apparatus to a navigation mode; a storage module which stores a plurality of audio files, each audio file comprising a highlight section; a control module which extracts the audio files from the storage module in response to the command received by the input module and plays back the highlight sections of the audio files while adjusting a volume level for each of the audio files; and an output module which outputs to the user the highlight sections of the audio files played back by the control module.

According to another aspect of the present invention, there is provided a method of navigating through audio files including switching an apparatus from playing back mode for audio files to a navigation mode with the aid of a navigation switching unit; playing back a highlight section of a first audio file in the navigation mode; reducing a volume level for the first audio file and increasing a volume level for a second audio file; and playing back a highlight section of the second audio file.

BRIEF DESCRIPTION OF THE DRAWINGS

The above and other aspects of the present invention will become more apparent by describing in detail exemplary embodiments thereof with reference to the attached drawings in which:

FIG. 9A is a diagram illustrating a plurality of function buttons according to an exemplary embodiment of the present invention;

FIGS. 9B and 9C are tables presenting functions respectively provided by the function buttons.

DETAILED DESCRIPTION OF EXEMPLARY EMBODIMENTS OF THE INVENTION

Figure 1:
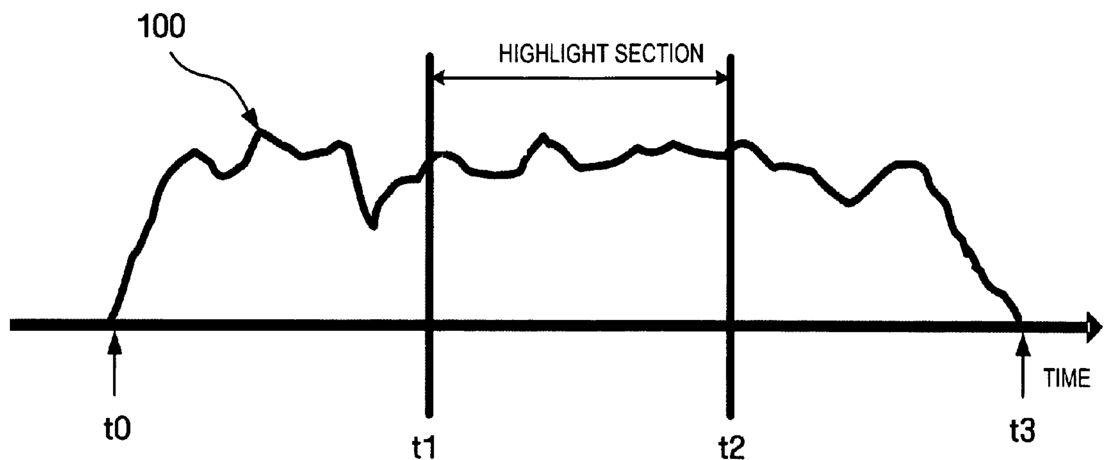
FIG. 1 is a diagram illustrating a highlight section of an audio file.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims.

An apparatus for playing back audio files and a method of navigating through audio files using the apparatus according to the present invention will be described in part below with reference to flowchart illustrations and/or block diagrams of methods, systems, computer program products and data and/or system architecture structures according to exemplary embodiments of the invention. It will be understood that each block of the illustrations, and/or combinations of blocks, can be implemented by computer program instructions. These computer program instructions may be provided to a processor of a general-purpose computer, special purpose computer, or other programmable data processing apparatus to produce a machine, such that the instructions, which are executed via the processor of the computer or other programmable data processing apparatus, create means for implementing the functions/acts specified in the block or blocks.

These computer program instructions may also be stored in a computer-readable memory or storage that can direct a computer or other programmable data processing apparatus to function in a particular manner, such that the instructions stored in the computer-readable memory or storage produce an article of manufacture including instruction means which implement the function/act specified in the block or blocks. The computer program instructions may also be loaded onto a computer or other programmable data processing apparatus to cause a series of operational steps to be performed on the computer or other programmable apparatus to produce a computer implemented process such that the instructions which are executed on the computer or other programmable apparatus provide steps for implementing the functions/acts specified in the block or blocks.

In addition, each block may represent a module, a segment, or a portion of code, which may comprise one or more executable instructions for implementing the specified logical functions. It should also be noted that in other implementations, the functions noted in the blocks may occur out of the order noted or in different configurations of hardware and software. For example, two blocks shown in succession may, in fact, be executed substantially concurrently, or the blocks may sometimes be executed in the reverse order, depending on the functionality involved.

The present invention will now be described more fully with reference to the accompanying drawings, in which exemplary embodiments of the invention are shown.

For a better understanding of the present invention, assume that an audio file to be played back comprises music information. The music information may include additional information such as singer information, songwriter information, and year-of-production information, and highlight section information. A portion of an audio file chosen to be played back will hereinafter be referred to as a highlight section.

Figure 2:
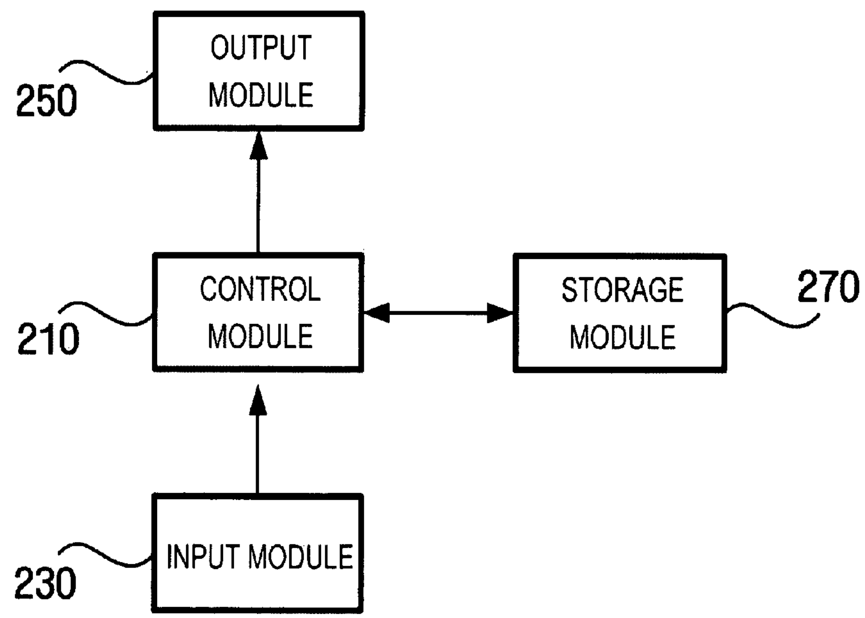
FIG. 2 is a block diagram of an apparatus for playing back audio files according to an exemplary embodiment of the present invention.

FIG. 2 is a block diagram of an apparatus 200 for playing back audio files according to an exemplary embodiment of the present invention. Referring to FIG. 2, the apparatus 200 includes a control module 210, an input module 230, an output module 250, and a storage module 270. The apparatus 200 may read an audio file that is in the format of digital data, and play back the audio file with the aid of a sound output device such as a speaker, a headphone, or an earphone.

As used herein, the term "module" may include, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they are executed one or more computers in a communication system.

The input module 230 receives from a user navigation input for choosing one of a plurality of music items and playback input for playing back the chosen music item. The input module 230 may be comprised of one or more buttons, a touch screen, or a joystick.

The storage module 270 stores a plurality of audio files. The storage module 270 may be comprised of a storage medium such as a memory, a hard disc, a portable disc, or an optical disc which can store files.

The control module 210 extracts an audio file chosen by the user from the storage module 270 in response to user input received by the input module 230, and plays back the entire extracted audio file or only a highlight section of the extracted audio file. Also, the control module 210 may display to the user an audio file list including the audio files stored in the storage module 270 with the aid of the output module 250. The operation of the control module 210 will be described later in further detail with reference to FIGS. 3 and 4.

The output module 250 may visually or audibly output the audio files stored in the storage module 270 under the control of the control module 210. The visual output of the audio files stored in the storage module 270 may be interpreted as displaying an audio file list including the audio files stored in the storage module 270 or additional information of the audio files on the screen of a display device. The auditory output of the audio files stored in the storage module 270 may be interpreted as outputting the entire audio files stored in the storage module 270 or only highlight sections of the corresponding audio files via a speaker.

Playback of the highlight sections of the audio files stored in the storage module 270 will hereinafter be described in detail.

The user issues a request for playback of highlight sections of the audio files stored in the storage module 270 to the input module 230. In other words, the user may visually navigate through the audio files stored in the storage module 270 when the audio files are visually output by the output module 250. According to the present exemplary embodiment, the user may navigate through the audio files stored in the storage module 270 while listening to highlight sections of the audio files.

The control module 210 sequentially extracts the audio files stored in the storage module 270 corresponding to the request issued by the user, and plays back the highlight sections of the extracted audio files using a transition method according to an exemplary embodiment of the present invention. Then, the highlight sections of the extracted audio files are output via a speaker of the output module 250. The user chooses a desired audio file from the extracted audio files, and issues a request for the playback of the entire desired audio file to the input module 230 while listening to the highlight sections of the extracted audio files. Then, the control module 210 plays back the entire desired audio file.

The transition method according to the present invention will hereinafter be described in further detail with reference to FIGS. 5A through 5C.

Figure 5A:
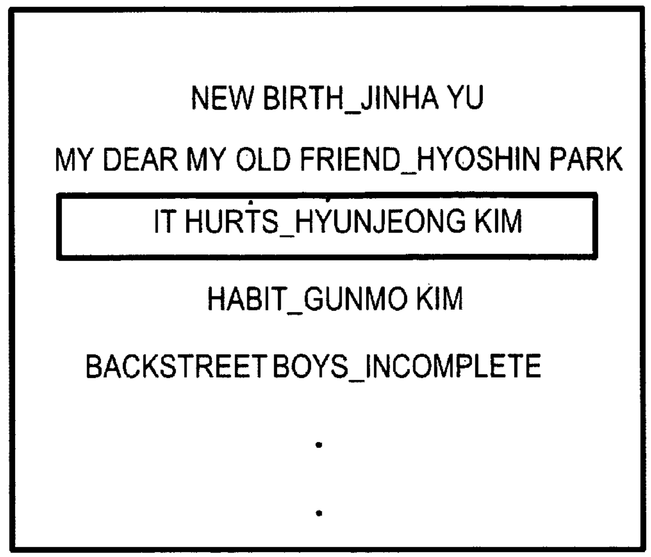
FIGS. 5A, 5B and 5C are diagrams for explaining a transition between highlight sections according to an exemplary embodiment of the present invention.

It is assumed that an audio file list including the audio files stored in the storage module 270 is as illustrated in FIG. 5A and that an audio file whose highlight section is currently being played back is the song "It Hurts" sung by the Korean singer Hyunjeong Kim. When the playback of the highlight section of the song "It Hurts" is concluded, a highlight section of the song "Habit" sung by the Korean singer Gunmo Kim begins to be played back. During a transition from one song to another, a volume level does not drastically change but gradually changes over time. Here, the volume level may be the amplitude of sound waves output via a speaker.

Figure 5B:
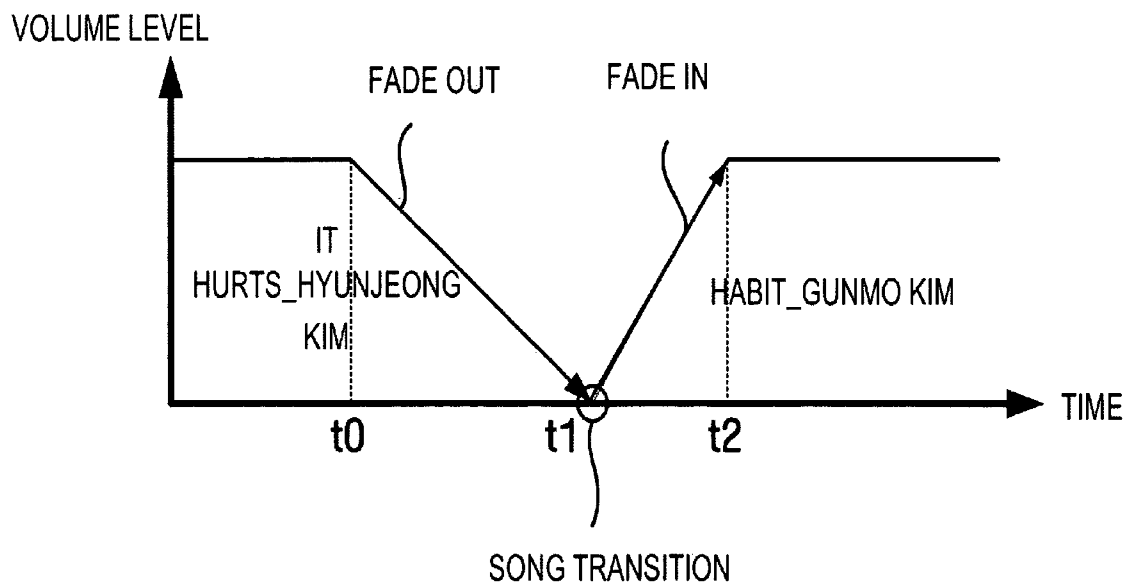
Figure 5C:
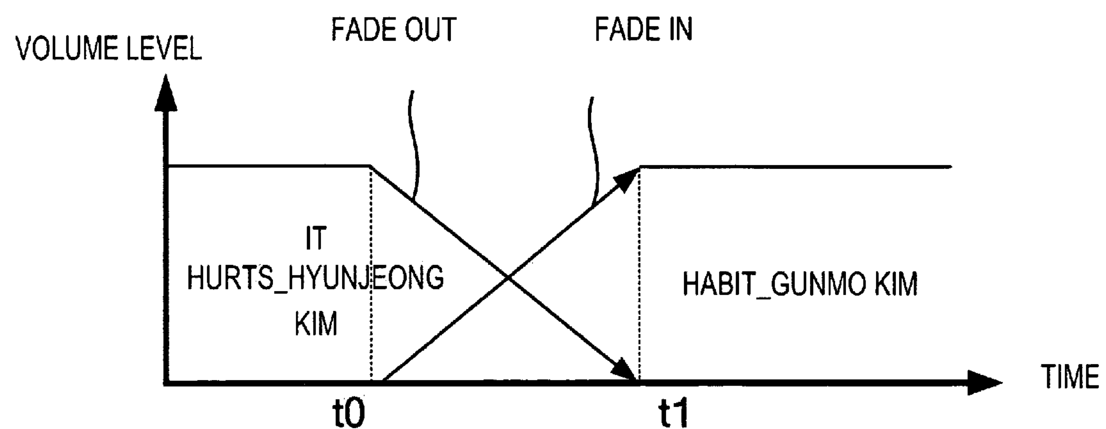

Variations in the volume level are illustrated in FIGS. 5B and 5C.

Referring to FIG. 5B, the highlight section of the song "It Hurts" sung by the Korean singer Hyunjeong Kim ends at a time t0. Then, the remaining song "It Hurts" gradually fades out over time until a time t1. That is, a volume level for the song "It Hurts," i.e., the sound volume of the song "It Hurts," gradually decreases over time until the time t1. The song "It Hurts" is not heard any longer at the time t1. Then, the song "Habit" sung by the Korean singer Gunmo Kim begins to fade in. That is, a volume level for the song "Habit," i.e., the sound volume of the song "Habit," gradually increases over time until a time t2. Then, the highlight section of the song "Habit" begins to be played back at the time t2. Referring to FIG. 5B, a transition between the song "It Hurts" and the song "Habit" occurs at the time t1, and the highlight sections of the songs "It Hurts" and "Habit" are sequentially played back without overlapping each other. This type of transition between highlight sections is referred to as sequential fading.

Another example of a method of transiting from one song to another will hereinafter be described in detail with reference to FIG. 5C. Referring to FIG. 5C, the highlight section of the song "It Hurts" sung by the Korean singer Hyunjeong Kim ends at the time t0, and the remaining song "It Hurts" begins to fade out at the time t0. Here, the volume level for the song "It Hurts," i.e., the sound volume of the song "It Hurts," gradually decreases over time. The fadeout of the song "It Hurts" is concluded at the time t1.

At the time t0 when the song "It Hurts" begins to fade out, the song "Habit" sung by the Korean Singer Gunmo Kim begins to fade in. That is, the volume level for the song "Habit" gradually increases over time until the time t1. At the time t1, the highlight section of the song "Habit" begins to be played back.

Referring to FIG. 5C, a transition from the song "It Hurts" to the song "Habit" occurs between the time t0 and the time t1, and the songs "It Hurts" and "Habit" are played back between the time t0 and the time t1 by overlapping each other.

The type of transition from one song to another illustrated in FIG. 5C is referred to as overlap fading. Referring to FIG. 5C, the time (t0) when the song "It Hurts" begins to fade out coincides with the time (t0) when the song "Habit" begins to fade in. However, the present invention is not restricted to this. In other words, any audio file playback method that results in an overlapping time period of the playback of one song and the playback of another song may be considered as overlap fading according to an exemplary embodiment of the present invention.

Referring to FIGS. 5B and 5C, a fade-in section and a fade-out section do not correspond to a highlight section of a song. Thus, according to the present exemplary embodiment, a margin section is needed to make a song fade in or fade out properly, and this will hereinafter be described in detail with reference to FIG. 6.

Figure 6:
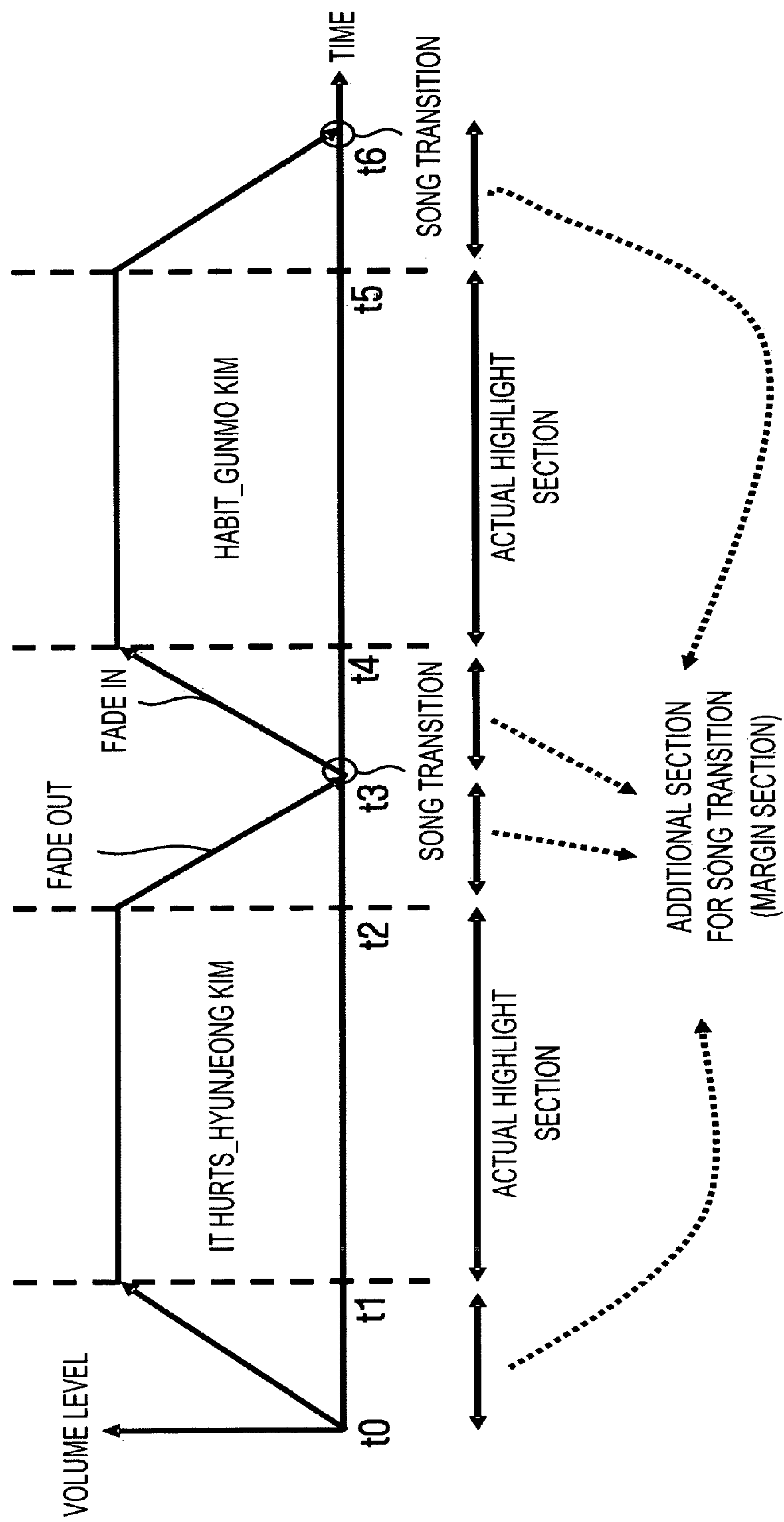
FIG. 6 is a diagram illustrating a margin section needed to play back a highlight section according to an exemplary embodiment of the present invention.

FIG. 6 illustrates sequential fading. Referring to FIG. 6, the highlight section of the song "It Hurts" corresponds to a time period between a time t1 and a time t2, the highlight section of the song "Habit" corresponds to a time period between a time t4 and a time t5, an additional section for a transition from the song "It Hurts" to the song "Habit", i.e., a margin section, corresponds to a time period between t2 and t4.

Alternatively, a fade-in section and a fade-out section may both provided inside a highlight section of an audio file. In this case, an additional margin section is unnecessary. In other words, it is determined whether to provide a margin section according to the operation of the control module 210 illustrated in FIG. 2.

Figure 3:
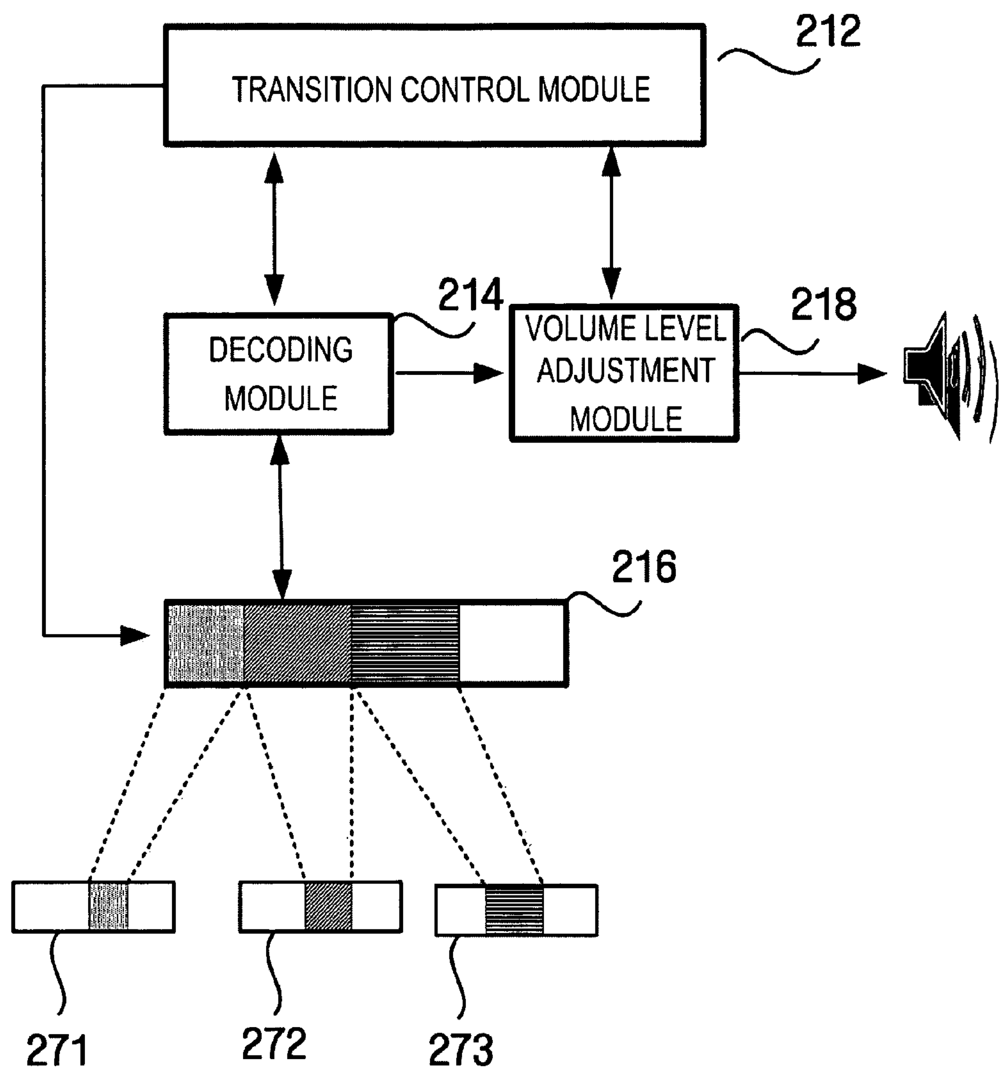
FIG. 3 is a block diagram of an example of a control module illustrated in FIG. 2.

FIG. 3 is a block diagram of an example of the control module 210 illustrated in FIG. 2.

Referring to FIG. 3, the control module 210 includes a transition control module 212, a decoding module 214, a buffer 216, and a volume level adjustment module 218.

The transition control module 212 performs highlight-navigation upon the request of a user. To achieve this, the transition control module 212 stores audio data of the highlight sections of first, second, and third audio files 271, 272, and 273 stored in the storage module 270 in the buffer 216.

Thereafter, the decoding module 214 decodes the audio data stored in the buffer 216. At this time, the decoding module 214 may decode the audio data stored in the buffer 216 according to a predetermined sequence so as to enable transitions between the highlight sections of the first, second, and third audio files 271, 272, and 273 using the sequential fading method illustrated in FIG. 5B or the overlapping fading method illustrated in FIG. 5C.

The volume level adjustment module 218 adjusts a volume level for the decoded audio data provided by the decoding module 214, i.e., the sound volume of the decoded audio data provided by the decoding module 214, and outputs the decoded audio data provided by the decoding module 214 according to the results of the adjustment. Here, the volume level adjustment module 218 may adjust the volume level for the decoded audio data provided by the decoding module 214 using the sequential fading method or the overlapping fading method. Since the buffer 216 only stores the audio data of the highlight sections of the first, second, and third audio files 271, 272, and 273, the results of the adjustment performed by the volume level adjustment module 228 do not provide an additional margin section such as the one illustrated in FIG. 6.

Figure 4:
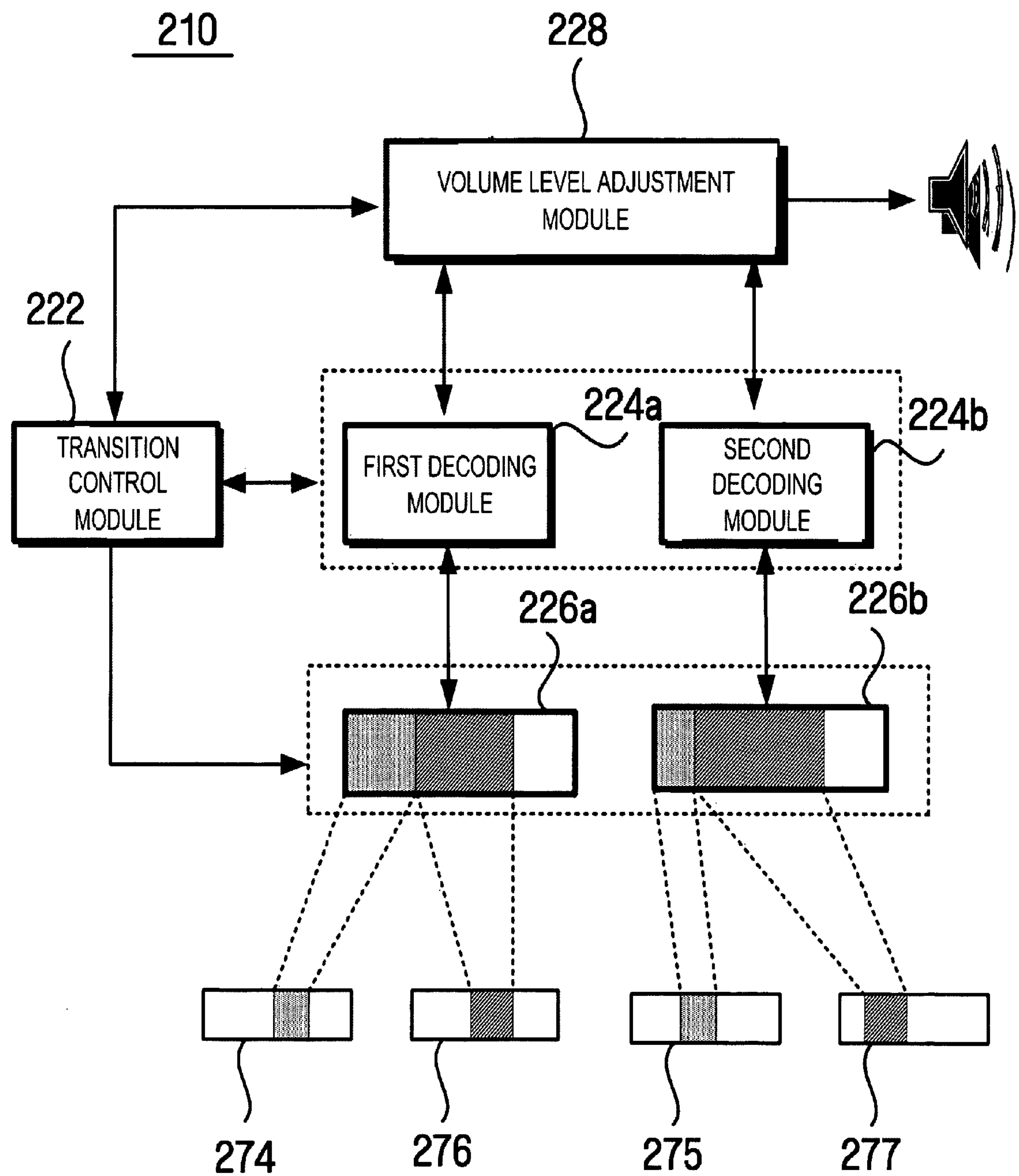
FIG. 4 is a block diagram of another example of the control module illustrated in FIG. 2.

FIG. 4 is a block diagram of another example of the control module 210 illustrated in FIG. 2.

Referring to FIG. 4, the control module 210 includes a transition control module 222, a first decoding module 224*a*, a second decoding module 224*b*, a first buffer 226*a*, a second buffer 226*b*, and a volume level adjustment module 228.

The transition control module 222 performs highlight-navigation upon the request of a user. To achieve this, the transition control module 212 stores audio data of the highlight sections of first and third audio files 274 and 276 stored in the storage module 270 in the first buffer 226*a*, and audio data of the highlight sections of second and fourth audio files 275 and 277 stored in the storage module 270 in the second buffer 226*b*.

Thereafter, the first decoding module 224*a* and the second decoding module 224 respectively decode the audio data stored in the first buffer 226*a* and the second buffer 226*b*. Here, the first decoding module 224*a* and the second decoding module 224 may respectively decode the audio data stored in the first buffer 226*a* and the second buffer 226*b* according to a predetermined sequence so as to enable transitions between the highlight sections of the first, second, third, and fourth audio files 274, 275, 276, and 277 using the sequential fading method illustrated in FIG. 5B or the overlapping fading method illustrated in FIG. 5C. For example, the first decoding module 224*a* decodes the highlight section of the first song 274, the second decoding module 224*b* decodes the highlight section of the second song 275, the first decoding module 224*a* decodes the highlight section of the third song 276, and then the second decoding module 224*b* decodes the highlight section of the fourth song 277. The transition control module 222 may control the first and second decoding modules 224*a* and 224*b* to perform sequential fading or overlapping fading.

The volume level adjustment module 228 adjusts a volume level for the decoded audio data provided by the first and second decoding modules 224*a* and 224*b*, i.e., the sound volume of the decoded audio data provided by the first and second decoding modules 224*a* and 224*b*, and outputs the decoded audio data provided by the first and second decoding modules 224*a* and 224*b* according to the results of the adjustment. Here, the volume level adjustment module 228 may adjust the volume level for the decoded audio data provided by the first and second decoding modules 224*a* and 224*b* using the sequential fading method or the overlapping fading method. Since the first and second buffers 226*a* and 226*b* only store the audio data of the highlight sections of the first, second, third, and fourth audio files 274, 275, 276, and 277, the results of the adjustment performed by the volume level adjustment module 228 do not provide an additional margin section such as the one illustrated in FIG. 6.

Figure 7A:
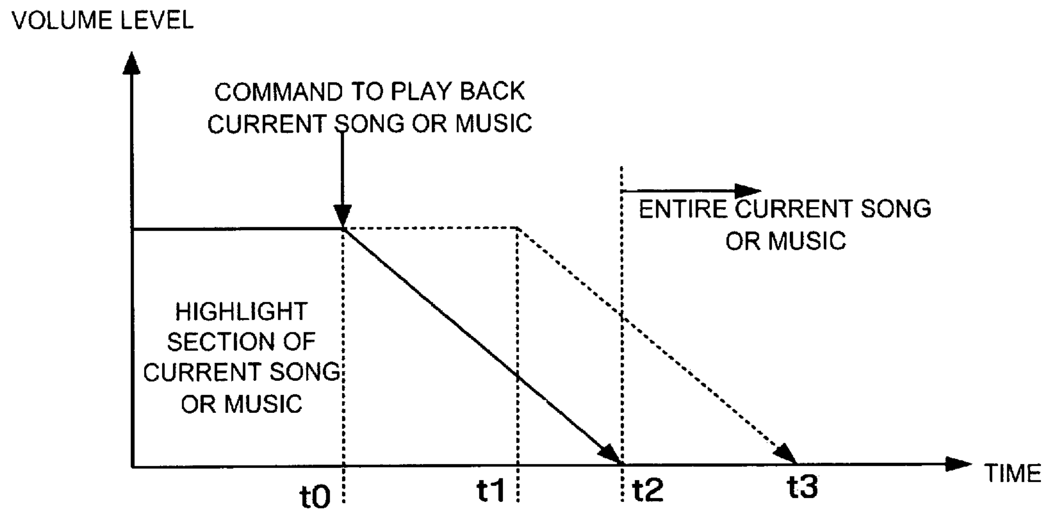
FIGS. 7A and 7B are diagrams for explaining a transition between highlight sections according to function button input, according to an exemplary embodiment of the present invention.
Figure 7B:
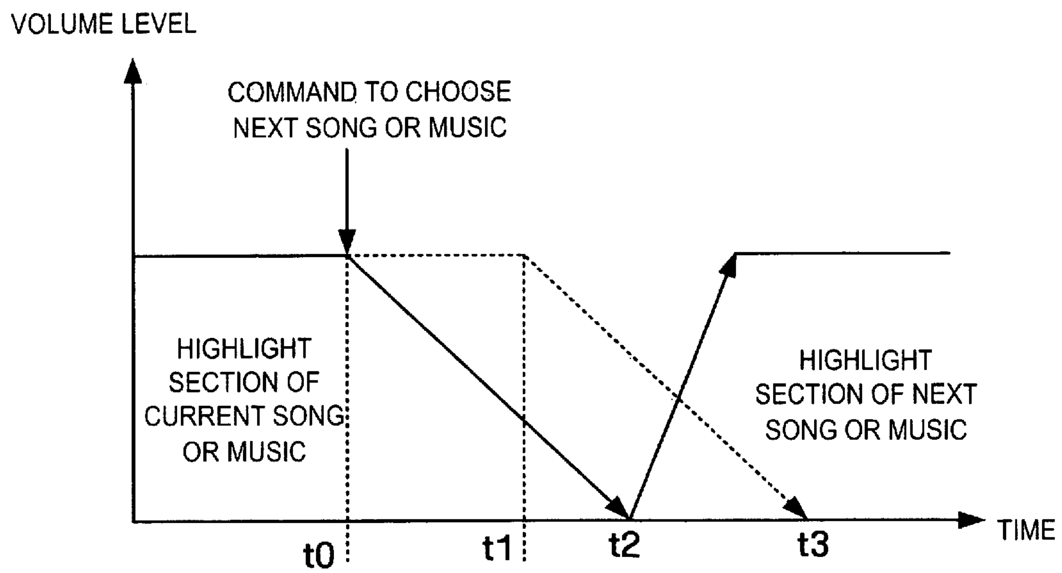

FIGS. 7A and 7B are diagrams for explaining a transition between highlight sections according to function button input according to an exemplary embodiment of the present invention.

The control module 210 of the apparatus 200 illustrated in FIG. 2 may automatically navigate through the highlight sections of audio files stored in the storage module 270. Also, the control module 210 may allow a user to manually navigate through the audio files stored in the storage module 270 or to play back a desired audio file chosen from the audio files stored in the storage module 270.

Referring to FIG. 7A, a highlight section of an audio file (hereinafter referred to as the current audio file) currently being played back is supposed to fade out between a time t1 and a time t3. However, if a user hits a play button at a time t0 to play back the entire current audio file, the highlight section of the current audio file may fade out between the time t0 and the time t2, and the entire current audio file may begin to be played back at the time t2.

Referring to FIG. 7B, a highlight section of a current audio file is supposed to fade out between a time t1 and a time t3. However, if a user hits a select button at the time t0 to choose an audio file next to the current audio file, a highlight section of the next audio file may begin to be played back at the time t2.

Figure 8:
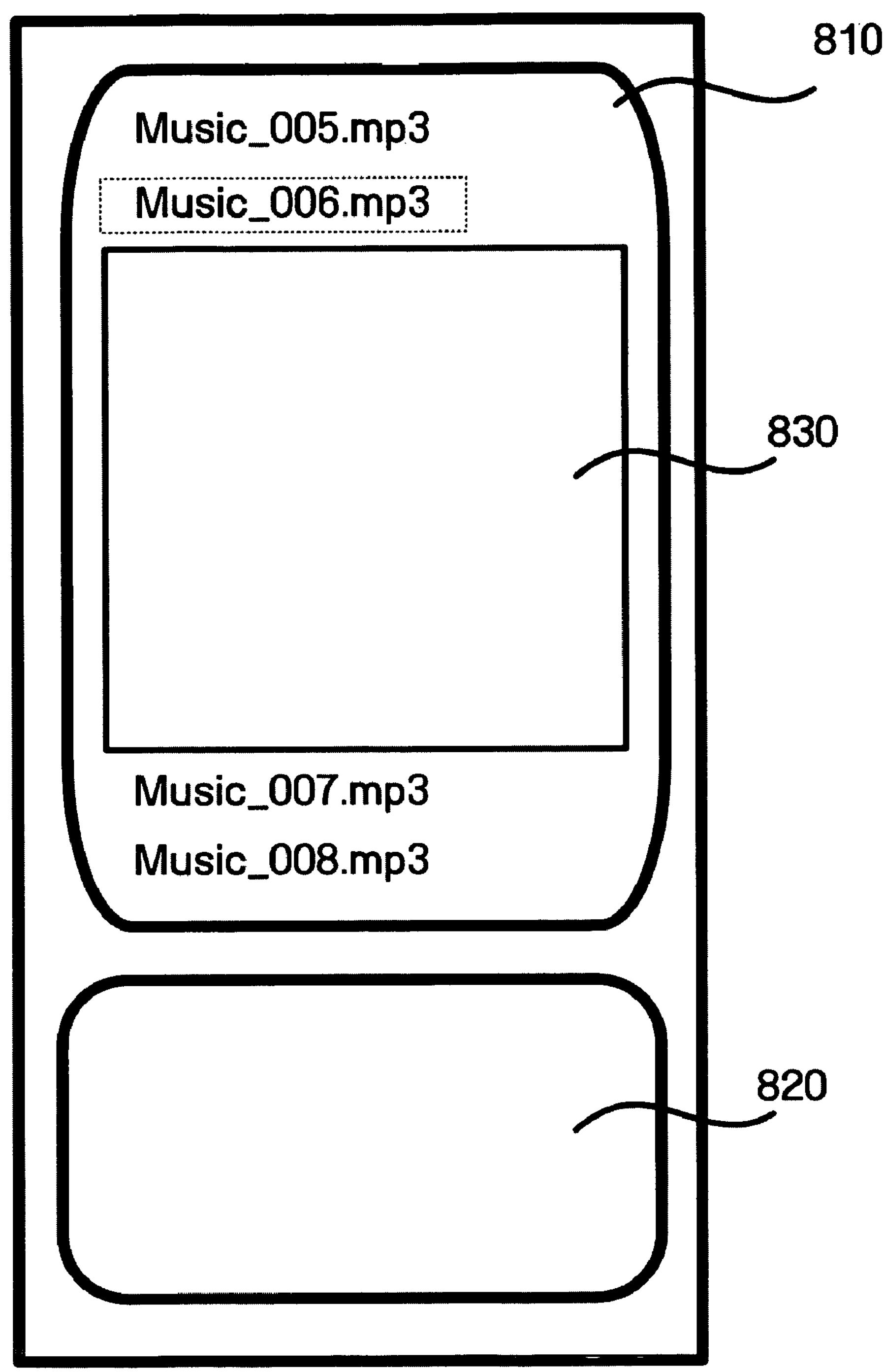
FIG. 8 is a diagram of an apparatus for playing back audio files according to another exemplary embodiment of the present invention.

FIG. 8 is a diagram of an apparatus 800 for playing back audio files according to an exemplary embodiment of the present invention. Referring to FIG. 8, the apparatus 800 includes a display screen 810 which displays an audio file list including a plurality of audio files, and an input unit 820 which navigates through the audio files or chooses one of the audio files. Also, the apparatus 800 includes a speaker (not shown) and can thus play back and output with the speaker a highlight section of an audio file chosen by a user when the user navigates through the audio files. Therefore, the user can navigate through the audio files by listening to the highlight sections of the audio files without even looking at the audio file displayed on the display screen 810.

The apparatus 800 may also include an additional information display zone 830 which displays additional information regarding the audio files through which the user navigates. For example, if an audio file Music_006.mp3 is selected by a navigation cursor, as indicated by the dotted lines, the additional information display zone 830 may display various information regarding a song or music corresponding to the audio file Music_006.mp3 as text or an image, thus providing the user with various information regarding songs or music.

FIG. 9A is a diagram illustrating a plurality of function buttons 901, 903, 905, 907, and 909 according to an exemplary embodiment of the present invention, and FIGS. 9B and 9C are tables presenting functions respectively provided by the function buttons 903, 905, 907, and 909.

The function buttons 901, 903, 905, 907, and 909 illustrated in FIG. 9A may be included in the input module 230 illustrated in FIG. 2 or the input unit 820 illustrated in FIG. 8. When a user hits the function button 901, i.e., a navigation button, the apparatus 200 or 800 is switched to a navigation mode. The navigation button 901 may be realized as a sensor, a jog-shuttle, or a touch sensor that can sense certain motions.

The apparatus 200 or 800 may operate in the navigation mode or a playback mode. In the navigation mode, the apparatus 200 or 800 navigates through a plurality of audio files. In the playback mode, the apparatus 200 or 800 plays back an entire audio file chosen by a user.

According to the present exemplary embodiment, the function buttons 903, 905, 907, and 909 can be used in both the navigation mode and the playback mode, and this will hereinafter be described in detail with reference to FIGS. 9B and 9C.

FIG. 9B explains the operation of the apparatus 200 or 800 according to a user's action when the apparatus 200 or 800 is switched to the navigation mode by using the navigation button 901, and FIG. 9C explains the operation of the apparatus 200 or 800 in the playback mode according to the user's action. The apparatus 200 or 800 may be switched between the navigation mode and the playback mode by using a toggle function of the navigation button 901.

In other words, according to the present exemplary embodiment, the navigation button 901 is provided for switching the apparatus 200 or 800 to the navigation mode, and audio files are played back using typical function buttons.

Figure 10:
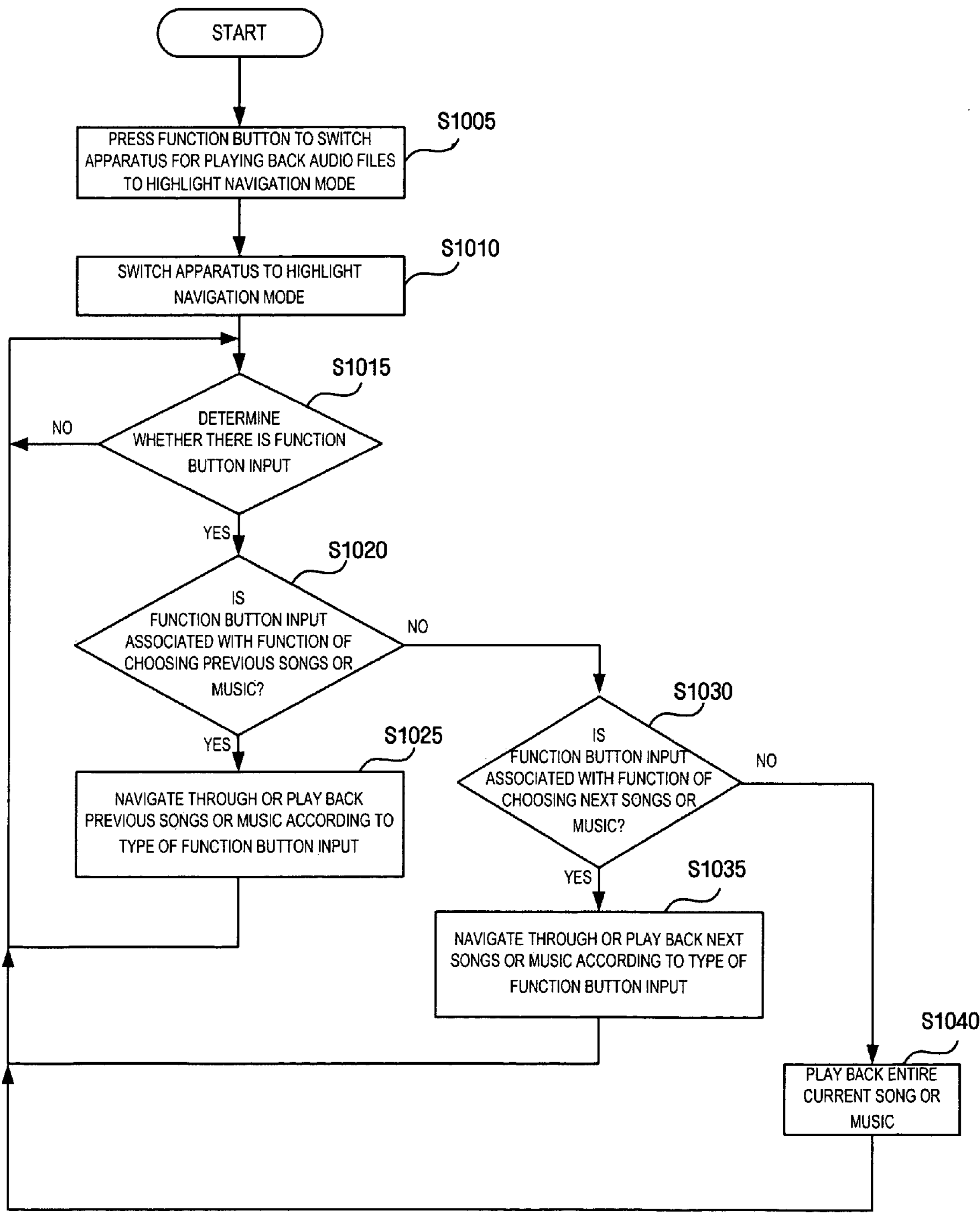
FIG. 10 is a flowchart illustrating a method of navigating through and playing back audio files, each audio file comprising a highlight section, according to an exemplary embodiment of the present invention.

FIG. 10 is a flowchart illustrating a method of navigating through and playing back audio files each comprising a highlight section according to an exemplary embodiment of the present invention. Referring to FIG. 10, in operation S1005, a user hits the navigation button 901, which is attached on an apparatus for playing back audio files, in order to switch the apparatus to a navigation mode. In operation S1010, the apparatus is switched to the navigation mode. Then, the apparatus may automatically play back the highlight sections of a plurality of audio files stored in the apparatus using a sequential fading method or an overlapping fading method according to an exemplary embodiment of the present invention.

In operation S1015, it is determined whether there is user input associated with any of the function buttons 903, 905, 907, and 909 illustrated in FIG. 9A while the apparatus automatically navigates through the audio files. In operation S1020, it is determined whether there is user input associated with the function button 907 that is used to select previous songs or music. In operation S1025, if it is determined in operation S1020 that there is user input associated with the function button 907, the apparatus may navigate through or play back the highlight sections of previous songs or music according to the type of the user input. In detail, if it is determined in operation S1020 that the user has simply clicked the function button 907, the highlight section of a previous song or music may be played back. On the other hand, if it is determined in operation S1020 that the user has pressed the function button 907 for a predetermined amount of time, the highlight sections of previous songs or music are quickly played back and can thus be quickly navigated through. Assuming that the highlight sections of the previous songs or music are 30 seconds long, only a predefined part of each of the highlight sections of the previous songs or music, for example, a 10 second-long part of each of the highlight sections of the previous songs or music, is played back, thereby increasing the speed of highlight-navigation and enabling the user to quickly navigate through the audio files.

In operation S1030, if it is determined in operation S1020 that there is user input associated with a function button other than the function button 907, it is determined whether the user input is associated with the function button 909 that is used to select next songs or music. In operation S1035, if it is determined in operation S1030 that the user input is associated with the function button 909, the apparatus may navigate through or play back the highlight sections of next songs or music according to the type of the user input. In detail, if it is determined in operation S1030 that the user has simply clicked the function button 909, the highlight section of a next song or music is played back. On the other hand, if it is determined in operation S1030 that the user has pressed the function button 909 for a predetermined amount of time, the highlight sections of next songs or music are quickly played back and can thus be quickly navigated through. Assuming that the highlight sections of the next songs or music are 30 seconds long, only a predefined part of each of the highlight sections of the next songs or music, for example, a 10 second-long part of each of the highlight sections of the next songs or music, is played back, thereby increasing the speed of highlight-navigation and enabling the user to quickly navigate through the audio files.

In operation S1040, if it is determined in operation S1030 that the user input is associated with the function button 905 that is used to perform a playback function, an entire current song or music is played back. In this case, the apparatus may be automatically switched from the navigation mode to the playback mode.

The apparatus for playing back audio files according to the exemplary embodiment of the present invention can determine a user's music preferences by analyzing the user's navigation log information regarding the highlight sections of audio files. Also, the apparatus for playing back audio files according to the exemplary embodiment of the present invention can provide a user with, for example, a list of songs or music to be deleted or a list of recommended songs or music.

For example, if a user chooses a song or music while navigating through a plurality of audio files and plays back the entire chosen song or music, the apparatus for playing back audio files according to the exemplary embodiment of the present invention may determine that the user is interested in the chosen song or music, and include the chosen song or music in a list of songs or music of interest or use information of the chosen song or music as information regarding a music genre of interest.

In addition, if the user skips a predetermined song or music and proceeds to the next song or music, the apparatus for playing back audio files according to the exemplary embodiment of the present invention may determine that the user is not interested in the predetermined song or music and include the predetermined song or music in a list of songs or music to be deleted.

According to the exemplary embodiments of the present invention, it is possible to effectively navigate through a plurality of audio files, each audio file comprising a highlight section.

In addition, according to the exemplary embodiments of the present invention, it is possible to navigate through a considerable number of audio files within a short time.

Moreover, according to the exemplary embodiments of the present invention, a navigation function is provided using typical function buttons used to play back audio files, thereby preventing additional costs from being incurred by providing additional function buttons to provide the navigation function.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it is to be understood that the above-described exemplary embodiments have been provided only in a descriptive sense and will not be construed as placing any limitation on the scope of the invention.

What is claimed is:

1. An apparatus for playing back audio files, the apparatus comprising:

a storage module which stores a plurality of audio files, each of the audio files comprising a highlight section;

a control module which extracts a first audio file of the audio files from the storage module and plays back a highlight section of the first audio file while changing a volume level for the first audio file; and an output module which outputs to a user the highlight section of the first audio file played back by the control module, wherein the control module plays back the highlight section of the first audio file, plays back a section of the first audio file following the highlight section of the first audio file while gradually reducing a volume level of the section of the first audio file, plays back a section of a second audio file of the audio files preceding a highlight section of the second audio file while gradually increasing a volume level of the section of the second audio file, and plays back the highlight section of the second audio file, wherein a portion of an audio file having a high amplitude is chosen as the highlight section of the first audio file and the highlight section of the second audio file.

2. The apparatus of claim 1, wherein the control module plays back the section of the second audio file while gradually increasing the volume level of the section of the second audio file after playing back the section of the first audio signal while reducing the volume level of the section of the first audio file until the first audio file is not heard any longer.

3. The apparatus of claim 1, wherein the control module plays back the section of the second audio file while playing back the section of the first audio file.

4. The apparatus of claim 1, wherein the control module allocates a margin section to each of the highlight sections of the audio files to change the volume level for each of the audio files.

5. The apparatus of claim 1, further comprising an input module which comprises a navigation switching unit which switches the apparatus to a navigation mode.

6. The apparatus of claim 5, wherein the input module comprises a function button which is operable in both the navigation mode and a playback mode in which an audio file chosen by the user is played back.

7. The apparatus of claim 6, wherein, if the user manipulates the function button for an amount of time, the control module increases a speed of highlight navigation by playing back only a portion of each of the highlight sections of the audio files.

8. The apparatus of claim 6, wherein, if the user manipulates the function button, the control module plays back the highlight section of a previous or next audio file.

9. The apparatus of claim 8, wherein the output module provides the user with additional information regarding the audio files played back by the control module.

10. The apparatus of claim 1, wherein the control module analyzes a navigation operation performed by the user and determines audio file preferences of the user.

11. The apparatus of claim 1, wherein the control module comprises:

a transition control module which stores the highlight sections of the audio files in a buffer in response to the command received by the input module, and navigates through the highlight sections stored in the buffer;

a decoding module which decodes audio data of the highlight sections stored in the buffer; and a volume level adjustment module which changes a volume level for the decoded audio data, and outputs the decoded audio data according to results of the change.

12. The apparatus of claim 1, wherein the control module plays back a first section of the first audio file preceding the highlight section while gradually increasing the volume level of the first section, plays back the highlight section of the first audio file, and plays back a second section of the first audio file following the highlight section while gradually reducing the volume level of the second section.

13. The apparatus of claim 1 further comprising an input module which receives from a user a command to switch the apparatus to a navigation mode, wherein the control module extracts the first audio file from the storage module and plays back the highlight section of the first audio file in response to the command received by the input module.

14. A method of playing back audio files, the method comprising:

storing a plurality of audio files, each of the audio files comprising a highlight section;

extracting a first audio file of the audio files from the storage module and playing back a highlight section of the first audio file while changing a volume level for the first audio file;

outputting to a user the highlight section of the first audio file played back by the control module playing back a highlight section of the first audio file and then playing back a section of the first audio file following the highlight section while gradually reducing a volume level of the first audio file; and playing back a highlight section of a second audio file after playing back a section of the second audio file preceding the highlight section of the second audio file while gradually increasing a volume level of the section of second audio file, wherein the playing back of the highlight section of the second audio file is not performed until the section of the first audio file is not heard any longer, and wherein a portion of an audio file having a high amplitude is chosen as the highlight section of the first audio file and the highlight section of the second audio file.

15. The method of claim 14, wherein the playing back of the section of first audio file while gradually decreasing the volume level is performed at the same time as the playing back of the section of the second audio file while reducing the volume level.

16. The method of claim 14, wherein only a predefined portion of each of the highlight sections of the first and second audio files is played back if a function button used to play back the audio files is pressed for a certain amount of time.

17. The method of claim 14 further comprising switching an apparatus from playing back mode for audio files to a navigation mode prior to the playing back the highlight sections of the first and second audio files.

18. The method of claim 14, wherein the playing back the highlight section of the first audio file comprises initially playing back a preceding section of the first audio file which precedes the highlight section of the first audio file while gradually increasing the volume of the preceding section.

* * * * *